Oct. 25, 1932.  W. G. G. WEIDINGER  1,884,435
HYDROAEROPLANE
Filed Sept. 15, 1930   4 Sheets-Sheet 1

INVENTOR:
W. G. G. Weidinger
H. J. Sanders
ATTORNEY

Oct. 25, 1932.  W. G. G. WEIDINGER  1,884,435
HYDROAEROPLANE
Filed Sept. 15, 1930    4 Sheets-Sheet 3

INVENTOR:
W. G. G. Weidinger
BY H. J. Sanders
ATTORNEY

Oct. 25, 1932.  W. G. G. WEIDINGER  1,884,435
HYDROAEROPLANE
Filed Sept. 15, 1930  4 Sheets-Sheet 4
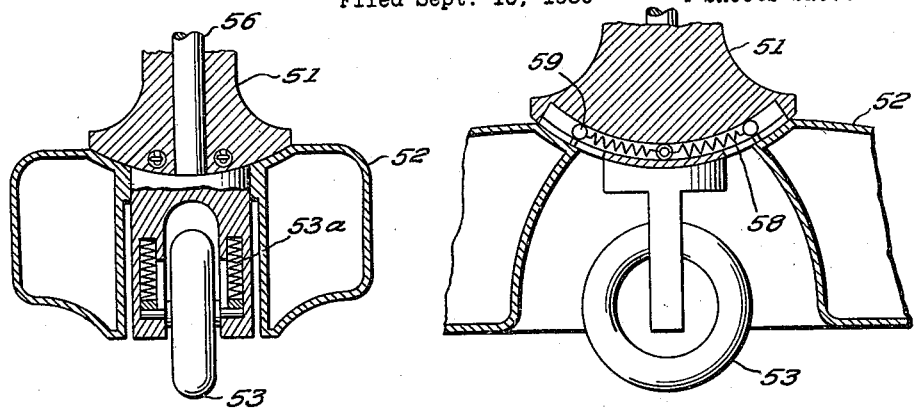
FIG. 7          FIG. 8
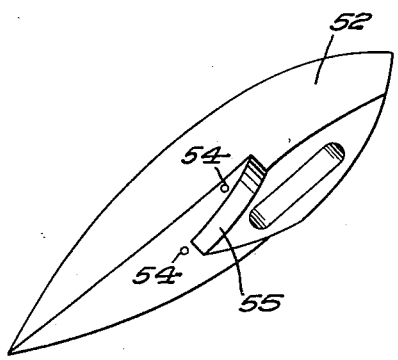     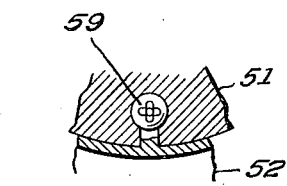
FIG. 10          FIG. 9
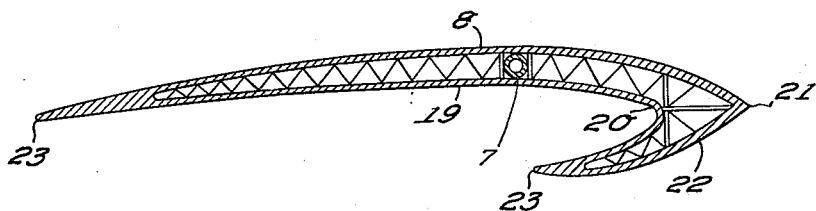
FIG. 11
INVENTOR:
W. G. G. Weidinger
BY H. J. Sanders
ATTORNEY Patented Oct. 25, 1932

1,884,435

UNITED STATES PATENT OFFICE

WILLIAM G. G. WEIDINGER, OF CHICAGO, ILLINOIS

HYDROAEROPLANE

Application filed September 15, 1930. Serial No. 481,918.

This invention relates to improvements in hydro-aeroplanes and more particularly to a machine of this type that can be used as an instrument of war when necessary and, with but minor changes or alterations, as a vehicle of commerce and transportation in time of peace. One object is to provide a hydro-aeroplane that is capable of great speed, that is economical in the use of fuel, that is capable of long sustained flights and of rising or descending perpendicularly when necessary.

With the foregoing and other objects in view the invention consists in the combination and arrangement of parts to be hereinafter fully described, pointed out in the claim and illustrated in the accompanying drawings which form a part of this application for patent and in which—

Fig. 7 is a vertical sectional view through one of the floats employed.

Fig. 8 is a similar view taken at right angles to Fig. 7.

Fig. 9 is an enlarged sectional detail view of Fig. 8.

Fig. 10 is an inverted view, reduced, in perspective of Fig. 7.

Fig. 11 is a longitudinal sectional view through one of the wing or tail plane shells.

Like reference characters denote corresponding parts throughout the several views.

Figure 1:
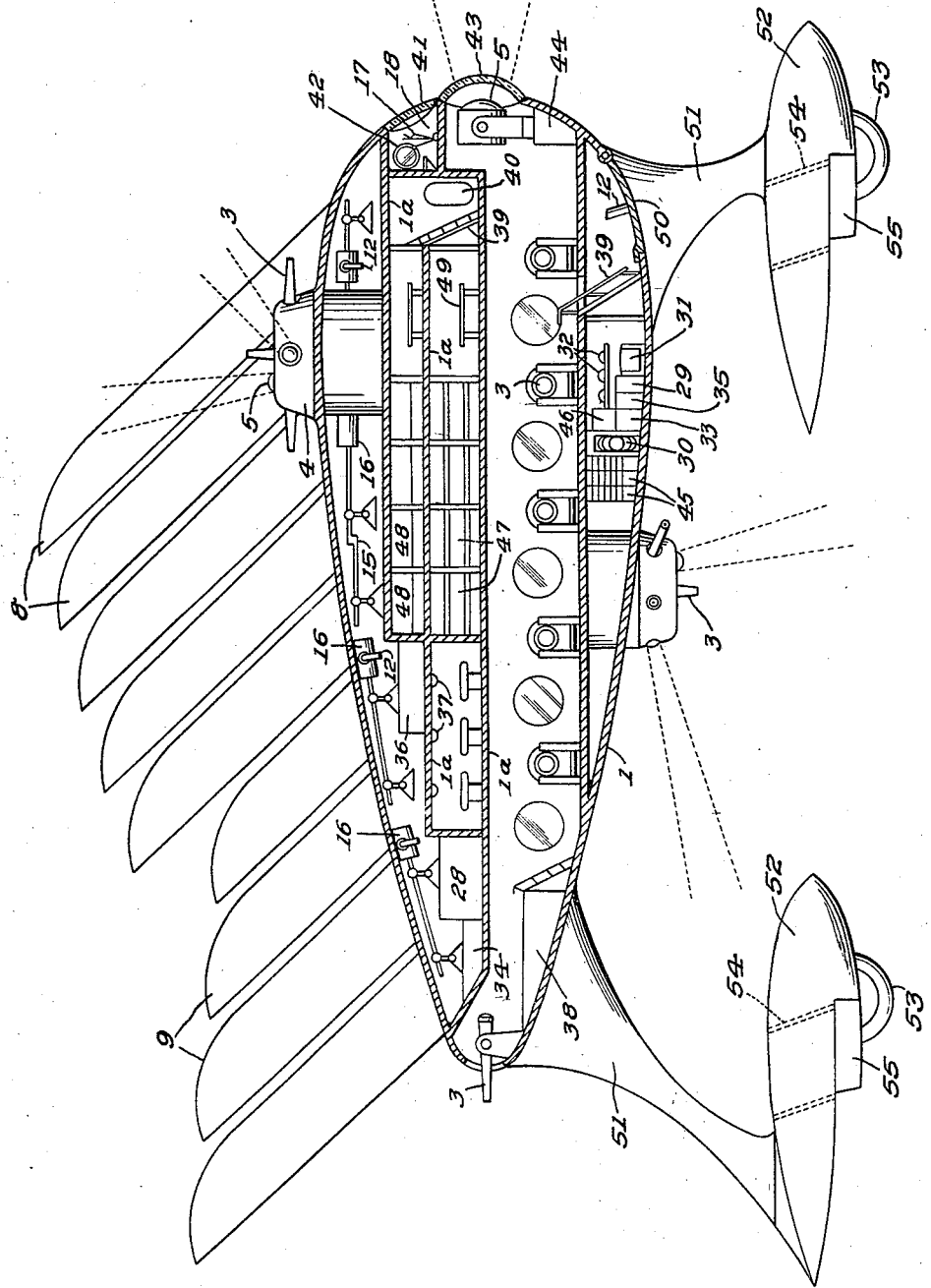
Fig. 1 is a vertical sectional view through the hydro-aeroplane.
Figure 2:
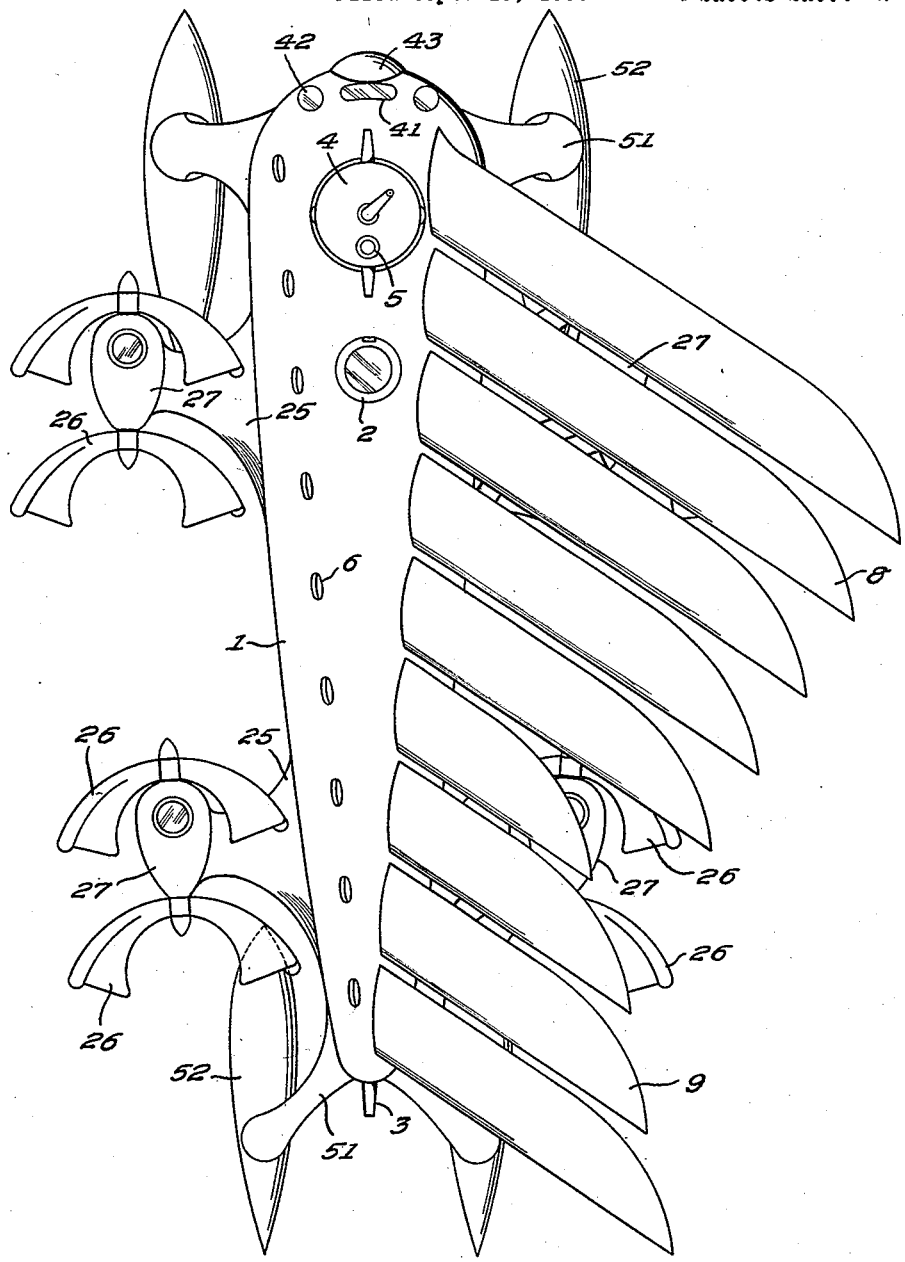
Fig. 2 is a top plan view of the machine with some of the wings and tail planes eliminated.
Figure 3:
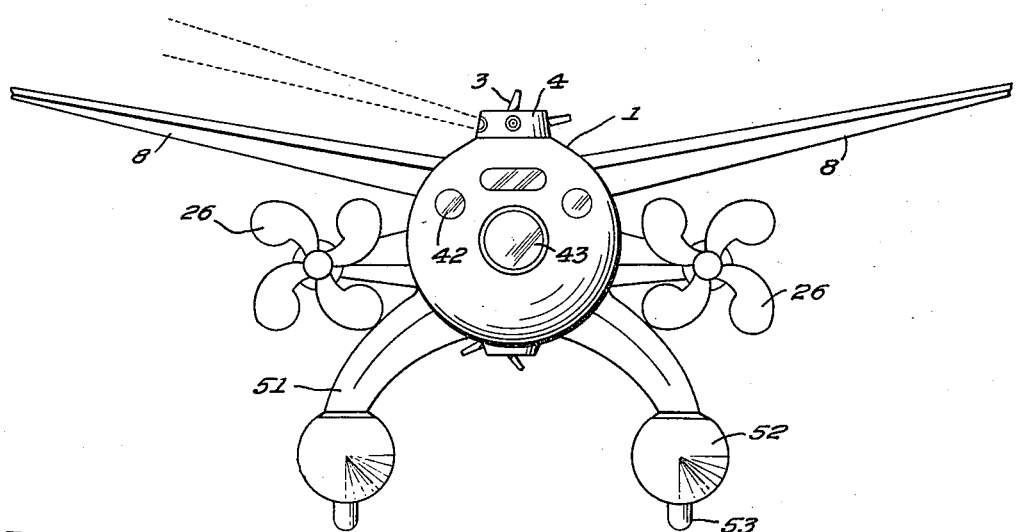
Fig. 3 is a front view of the machine.
Figure 4:
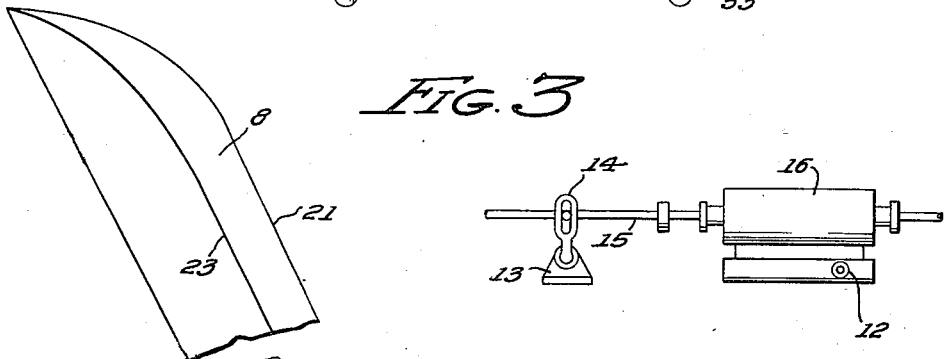
Fig. 4 is an enlarged fragmentary view illustrating the compressed air mechanism employed.
Figures 5, 6:
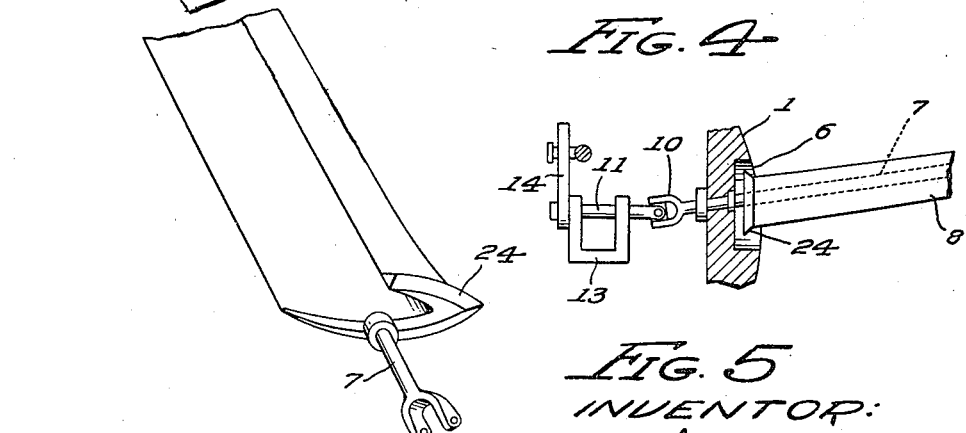
Fig. 5 is a fragmentary sectional detail view illustrating the mechanism employed for securing the wings and tail planes to the body and for the control of the former elements.
Fig. 6 is an enlarged fragmentary view of one of the wings employed.

The present machine comprises in one unit a water, air and land machine that may mount guns in time of war but that ordinarily comprises luxurious quarters for the traveling public, that is electrically lighted, steam heated, equipped with recreation quarters, dance parlors, radio compartments, swimming pools, shower baths etc. etc. with ample baggage and storage room and that is most fully equipped for long flights. The machine, over all, is of streamline design thus reducing its wind resistance to the minimum and materially enhancing its appearance. Its construction is such as to facilitate gliding in air or skimming lightly over the surface of the water.

The reference numeral 1 denotes the body, proper, of the machine which is substantially cigar shaped and which is divided interiorly with a plurality of partitions 1a and is provided in its upper side with the sky door 2 through the glass panel of which light is admitted and through which door access to the body interior is readily had. A turret 4 mounted upon the upper side or deck of the body mounts a plurality of guns 3 and search lights 5. Through the several perforations 6 arranged in two rows longitudinally of the body 1 a plurality of ribs 7 extend that run longitudinally and approximately centrally of the wings 8 and tail planes 9 that are spaced apart and extend outwardly and slightly upward and rearward from the body 1, said ribs being capable of rotation and being fixed to the wings and tail planes for moving the same.

The ribs terminate inside the body 1 and are connected by the universal joints 10 to the rotary studs 11 mounted in the bearings 13 arranged within the body 1, rockers 14 mounted to said bearings support the piston rods 15 operatively arranged in the cylinders 16 that are connected by the air hose or connections 12 with control means located in the operator's room 18 where are arranged a bank of control levers 17 for regulating and controlling the admission of compressed air to the said cylinders 16. Four compressed air cylinders 16 are arranged upon each side of the machine and to each cylinder is assigned the operation of a plurality of wings or tail planes. The cylinder 16 shown in Fig. 1 at the forward or larger end of the machine may control the first two wings, the next cylinder may control the next three wings and the two last cylinders shown may each control the operation of two of the four tail planes shown. In this manner two or more of the wings or tail planes may be operated independently, or together with, some or all of the rest of the planes and wings. This arrangement affords great flexibility of the machine in its air flights and permits it to climb or descend gradually or abruptly depending upon whether a few or all of the wings are moved simultaneously.

Each wing and tail plane is of hollow and interiorly webbed construction as shown in Fig. 11 thus affording a very light but strong construction and each wing and tail plane comprises a concave portion 19, a rounded portion 20 forming, in effect, an air pocket to enable it to grip the air, a forward air-cutting edge 21 and cutting edges 22, 23 and a rain water edge 24 designed to carry off rain, mist or dew that may fall or collect upon the wings and tail planes.

Supported from the body 1 by suitable brackets 25 are the propellers 26 which are driven by motors arranged in the housings 27, likewise supported, said motors being controlled by connection leading to the control room, the fuel tank 28 servicing said motors, pumps at 29 keeping said service tank filled automatically from a storage tank. A motor 30 also supplied from said tank 28 drives the dynamo 31 that operates the electric lights used for interior illumination, as well as the search lights 5. A suitable heater 32 supplies heat to the various compartments. A motor 33 supplies air for the compressed air tank 34 which tank is controlled from the operator's room and supplies compressed air to the pistons 16. A water pump 35 supplies the large water tank 36 which supplies the swimming pool, showers 37 and for drinking purposes. A waste water tank 38 is provided which is provided with a conventional discharge outlet under suitable control.

The several compartments aboard ship are connected by the ladders 39 and sliding doors 40 are provided likewise to further facilitate access to the several compartments. Sliding window 41, compartment windows 42 for light and air and an observation window 43 are provided. Radio broadcasting and receiving equipment 44 is provided, storage space 45 for luggage, a refrigerator compartment 46, ammunition room 47, berths 48 for the ship's crew, dining room equipment 49 for the crew and an exit trap door 50 for general use.

Great supports 51 depend from the body of the ship and attached thereto are the floats 52 provided with wheels 53 about which or associated therewith are the shock absorbing springs 53a, said floats or wheel housings being movable laterally and controlled in their operation from the operator's room. The wheels are provided with pneumatic tires and support the machine on land and permit its travel thereover in comfort. Compressed air is used in the steering operation and is supplied through the leads 12, air exhaust ports 54 being provided in said floats and a step 55. The shank 56 in each float is directly secured to the wheel fork or float member and steers the same by means of compressed air. The springs 53a and springs 58 secured to pins 59 absorb vertical and transverse or horizontal shocks.

With the machine in the water it may be started by starting the motors thus rotating the propellers. The floats will ride upon the water and can be used to steer the machine. High speed of the motor will cause the machine to skim rapidly over the surface of the water. Like manipulation will enable the machine to travel upon the land, riding upon the wheels 53.

When a good speed is attained upon land or in the water a proper inclination of the wings and tail planes will cause the machine to glide upwardly into the air for a flight. A reverse wing inclination will cause the machine to descend gently, rapidly, in a straight line or in a spiral as desired. To hold the machine in a given position in the air the forward propellers 26, or those at the forward end of the machine may be rotated forwardly, and the rear propellers rotated in the opposite direction, both sets of propellers rotating at moderate speed. The machine is one of great capacity and of large size and consequently one that will ride easily and comfortably and that is adapted for speedy travel over long distances.

What is claimed is:—

In hydro-aeroplanes, a body, great supports depending from said body, floats attached to said supports, wheels for said floats, spring arranged in said great supports substantially parallel with said wheels, forks for said wheels, the shanks of said forks being arranged in said great supports, and springs in said forks upon opposite sides of said wheels.

In testimony that I claim the foregoing as my own I have hereto affixed my signature.

WILLIAM G. G. WEIDINGER.